US010399610B2

(12) United States Patent
Heinecke

(10) Patent No.: US 10,399,610 B2
(45) Date of Patent: Sep. 3, 2019

(54) SELF-ADJUSTING SIDE FAIRINGS

(71) Applicant: VOLVO TRUCK CORPORATION, Göteborg (SE)

(72) Inventor: Mathew Frederick Heinecke, Kernersville, NC (US)

(73) Assignee: VOLVO TRUCK CORPORATION, Göteborg (SE)

( * ) Notice: Subject to any disclaimer, the term of this patent is extended or adjusted under 35 U.S.C. 154(b) by 0 days.

(21) Appl. No.: 15/501,897

(22) PCT Filed: Aug. 25, 2014

(86) PCT No.: PCT/US2014/052490
§ 371 (c)(1),
(2) Date: Feb. 6, 2017

(87) PCT Pub. No.: WO2016/032421
PCT Pub. Date: Mar. 3, 2016

(65) Prior Publication Data
US 2017/0225723 A1   Aug. 10, 2017

(51) Int. Cl.
*B62D 35/00* (2006.01)
(52) U.S. Cl.
CPC ................... *B62D 35/001* (2013.01)
(58) Field of Classification Search
CPC .. B62D 35/001; B62D 35/002; B62D 35/008; B62D 37/02
USPC ........................................... 296/180.2, 180.3
See application file for complete search history.

(56) References Cited

U.S. PATENT DOCUMENTS

| 4,685,715 A | * | 8/1987 | Hardin | B62D 35/001 |
| | | | | 296/180.3 |
| 4,904,015 A | | 2/1990 | Haines | |
| 5,078,448 A | * | 1/1992 | Selzer | B62D 35/001 |
| | | | | 105/1.2 |
| 5,536,062 A | * | 7/1996 | Spears | B62D 35/001 |
| | | | | 180/903 |

(Continued)

FOREIGN PATENT DOCUMENTS

DE   3248122 A1   7/1984

OTHER PUBLICATIONS

International Search Report (dated Dec. 18, 2014) for corresponding International App. PCT/US2014/052490.

(Continued)

*Primary Examiner* — Gregory A Blankenship
(74) *Attorney, Agent, or Firm* — Withrow & Terranova, PLLC

(57) ABSTRACT

The present invention relates to a self-adjusted side fairing assembly including a first side faring, a second side fairing, and biasing members. The first side fairing is adapted to be located at a trailing edge of a body on a lead vehicle. The second side fairing is adapted to be located at an opposing trailing edge of the body on the lead vehicle. The first and second side fairings have self-adjusting directional airflow characteristics in response to windward side and leeward side crosswind characteristics. The first and second side fairings are adapted so that trailing ends of the first and second side fairings pivot outward due to the effect of a high external pressure that is greater than high pressure threshold and generated by windward side crosswind characteristics.

12 Claims, 9 Drawing Sheets

(56) References Cited

U.S. PATENT DOCUMENTS

| | | | | |
|---|---|---|---|---|
| 5,653,493 A * | 8/1997 | Spears | ................ | B62D 35/001 |
| | | | | 296/180.2 |
| 6,128,084 A | 10/2000 | Nanbu et al. | | |
| 6,428,084 B1 * | 8/2002 | Liss | .................... | B62D 35/001 |
| | | | | 296/180.1 |
| 6,846,035 B2 * | 1/2005 | Wong | .................. | B62D 35/001 |
| | | | | 296/180.1 |
| 8,827,351 B1 * | 9/2014 | Kenevan | .............. | B62D 35/001 |
| | | | | 180/903 |
| 2003/0227194 A1 | 12/2003 | Farlow et al. | | |
| 2004/0239146 A1 * | 12/2004 | Ortega | ................ | B62D 35/001 |
| | | | | 296/180.2 |
| 2007/0089531 A1 * | 4/2007 | Wood | .................. | B62D 35/001 |
| | | | | 73/861.22 |
| 2007/0200390 A1 | 8/2007 | Lotarev et al. | | |
| 2010/0194143 A1 | 8/2010 | Perkins et al. | | |
| 2010/0201152 A1 * | 8/2010 | Smith | ................. | B62D 35/001 |
| | | | | 296/180.3 |
| 2011/0241377 A1 | 10/2011 | Rogers et al. | | |
| 2012/0038183 A1 | 2/2012 | Brewer | | |
| 2012/0139290 A1 * | 6/2012 | Kenevan | .............. | B62D 35/001 |
| | | | | 296/180.3 |
| 2016/0304137 A1 * | 10/2016 | Malone | ................ | B62D 35/001 |
| 2016/0325791 A1 * | 11/2016 | Smith | ................. | B62D 35/008 |
| 2017/0166266 A1 * | 6/2017 | Wall, II | ................ | B62D 35/001 |
| 2017/0225723 A1 * | 8/2017 | Heinecke | ............ | B62D 35/001 |

OTHER PUBLICATIONS

Written Opinion (dated Dec. 18, 2014) for corresponding International App. PCT/US2014/052490.

* cited by examiner

SELF-ADJUSTING SIDE FAIRINGS

FIELD OF THE INVENTION

The present invention relates to self-adjusting side fairings on a vehicle, such as a truck tractor.

BACKGROUND OF THE INVENTION

Many vehicles are provided with fairings that improve aerodynamics and reduce aerodynamic drag. In the trucking industry, it is commonplace for truck tractors to include side fairings that extend from the trailing edge of cab. Such side fairings are used to reduce aerodynamic drag by keeping airflow from entering a gap between the truck tractor and a trailer and by directing airflow closely along the sides of the trailer. Those of ordinary skill in the art will appreciate that airflow that enters the gap between the truck tractor and the trailer may contact the trailer face, which increases aerodynamic drag and reduces fuel economy. Those of ordinary skill the art will also appreciate that directing airflow closely along the sides of the trailer also increases aerodynamic efficiency.

The presence or absence of a crosswind can significantly influence fairing airflow and aerodynamic drag. By way of example, the presence of a crosswind on one side of the truck tractor may redirect fairing airflow into the gap. By way of another example, the absence of a crosswind on the other side of the truck tractor may cause airflow to be directed too far outward from the side of the trailer. Typically side fairings are designed to take into account the influences the presence or absence of a crosswind has on airflow and aerodynamic drag, but there is no configuration that attempts to account for the wide range of crosswind characteristics encountered, including the presence, absence, angle, and speed of crosswinds encountered as a truck tractor travels.

The present invention relates to side fairings that have self-adjusting airflow characteristics in response to encountered crosswind characteristics.

SUMMARY OF THE INVENTION

According to one embodiment of the present invention, a self-adjusting side fairing assembly comprises a first side faring, a second side fairing, and biasing members. The first side fairing is adapted to be located at a trailing edge of a body on a lead vehicle. The second side fairing is adapted to be located at an opposing trailing edge of the body on the lead vehicle. The first and second side fairings have self-adjusting directional airflow characteristics in response to windward side and leeward side crosswind characteristics. The first and second side fairings are adapted so that trailing ends of the first and second side fairings pivot outward due to the effect of a high external pressure that is greater than high pressure threshold and generated by windward side crosswind characteristics. The first and second side fairings are adapted so that trailing ends of the first and second side fairings pivot inward due to the effect of a low external pressure that is less than a low pressure threshold and generated by leeward side crosswind characteristics. The biasing members are adapted to bias the first and second side fairings in non-pivotable positions until the high or low external pressures cause the trailing ends to pivot outward or inward, relative to the non-pivotable positions.

According to another embodiment of the present invention, a method for providing a self-adjusting side fairing assembly comprises the steps of providing a first side fairing adapted to be located at a trailing edge of a body on a lead vehicle, a second side fairing adapted to be located at an opposing trailing edge of the body on the lead vehicle, and biasing members. The provided first and second side fairings are adapted so that trailing ends of the first and second side fairings pivot outward due to the effect of a high external pressure that is greater than high pressure threshold and generated by windward side crosswind characteristics and inward due to the effect of a low external pressure that is less than a low pressure threshold and generated by leeward side crosswind characteristics, whereby the first and second side fairings have self-adjusting directional airflow characteristics in response to windward side and leeward side crosswind characteristics. The provided biasing members are adapted to bias the first and second side fairings in non-pivotable positions until the high or low external pressures cause the trailing ends to pivot outward or inward, relative to the non-pivotable positions.

ASPECTS OF THE INVENTION

According to one aspect of the present invention, a self-adjusting side fairing assembly comprises:
  a first side fairing adapted to be located at a trailing edge of a body on a lead vehicle;
  a second side fairing adapted to be located at an opposing trailing edge of the body on the lead vehicle;
  the first and second side fairings adapted so that trailing ends of the first and second side fairings pivot outward due to the effect of a high external pressure that is greater than high pressure threshold and generated by windward side crosswind characteristics and inward due to the effect of a low external pressure that is less than a low pressure threshold and generated by leeward side crosswind characteristics, whereby the first and second side fairings have self-adjusting directional airflow characteristics in response to windward side and leeward side crosswind characteristics; and
  biasing members adapted to bias the first and second side fairings in non-pivotable positions until the high or low external pressures cause the trailing ends to pivot outward or inward, relative to the non-pivotable positions.

Preferably, the first and second side fairings include fixed fairing portions and pivotable fairing portions, wherein the first and second side fairings are adapted so that the fixed fairing portions are located closer to the body on the lead vehicle than the pivotable fairing portions.

Preferably, the first and second side fairings include fixed fairing portions and pivotable fairing portions, the trailing ends of the first and second side fairings are located on the pivotable fairing portions, and pivotable points provide an attachment interface between the fixed fairing portions and the pivotable fairing portions and allow the trailing ends on the pivotable fairing portions to pivot inward or outward relative to the fixed fairing portions and the body of the lead vehicle in response to the high and low external pressures.

Preferably, the first and second side fairings include pivotable fairing portions provided with leading ends and the trailing ends, the pivotable fairing portions being pivotable about pivot points and the pivot points are located closer to the trailing ends of the pivotable fairing portions than to the leading ends of the pivotable fairing portions.

Preferably, the first and second side fairings include pivotable fairing portions provided with leading ends and the trailing ends, the pivotable fairing portions being pivotable about pivot points and the pivot points are located at least about ⅔ along the length L between a terminus of the leading end and a terminus of the trailing end, whereby the pivot points are located closer to the trailing ends of the pivotable fairing portions than to the leading ends of the pivotable fairing portions.

Preferably, the fairings are interconnected by a linkage that extends from the first fairing to the second fairing and couples the pivotable motion of the first and second fairings together.

According to another aspect of the present invention, a method for providing a self-adjusting side fairing assembly comprises the steps of:

providing a first side fairing adapted to be located at a trailing edge of a body on a lead vehicle and a second side fairing adapted to be located at an opposing trailing edge of the body on the lead vehicle, wherein:
the first and second side fairings are adapted so that trailing ends of the first and second side fairings pivot outward due to the effect of a high external pressure that is greater than high pressure threshold and generated by windward side crosswind characteristics and inward due to the effect of a low external pressure that is less than a low pressure threshold and generated by leeward side crosswind characteristics, whereby the first and second side fairings have self-adjusting directional airflow characteristics in response to windward side and leeward side crosswind characteristics; and
providing biasing members that are adapted to bias the first and second side fairings in non-pivotable positions until the high or low external pressures cause the trailing ends to pivot outward or inward, relative to the non-pivotable positions.

Preferably, the first and second side fairings include fixed fairing portions and pivotable fairing portions, wherein the first and second side fairings are adapted so that the fixed fairing portions are located closer to the body on the lead vehicle than the pivotable fairing portions.

Preferably, the first and second side fairings include fixed fairing portions and pivotable fairing portions, the trailing ends of the first and second side fairings are located on the pivotable fairing portions, and pivotable points provide an attachment interface between the fixed fairing portions and the pivotable fairing portions and allow the trailing ends on the pivotable fairing portions to pivot inward or outward relative to the fixed fairing portions and the body of the lead vehicle in response to the high and low external pressures.

Preferably, the first and second side fairings include pivotable fairing portions provided with leading ends and the trailing ends, the pivotable fairing portions being pivotable about pivot points and the pivot points are located closer to the trailing ends of the pivotable fairing portions than to the leading ends of the pivotable fairing portions.

Preferably, the first and second side fairings include pivotable fairing portions provided with leading ends and the trailing ends, the pivotable fairing portions being pivotable about pivot points and the pivot points are located at least about ⅔ along the length L between a terminus of the leading end and a terminus of the trailing end, whereby the pivot points are located closer to the trailing ends of the pivotable fairing portions than to the leading ends of the pivotable fairing portions.

Preferably, the method further comprises the step of providing a linkage that interconnects the first and second fairings and couples the pivotable motion of the first and second fairings together.

DETAILED DESCRIPTION OF THE INVENTION

Figure 1:
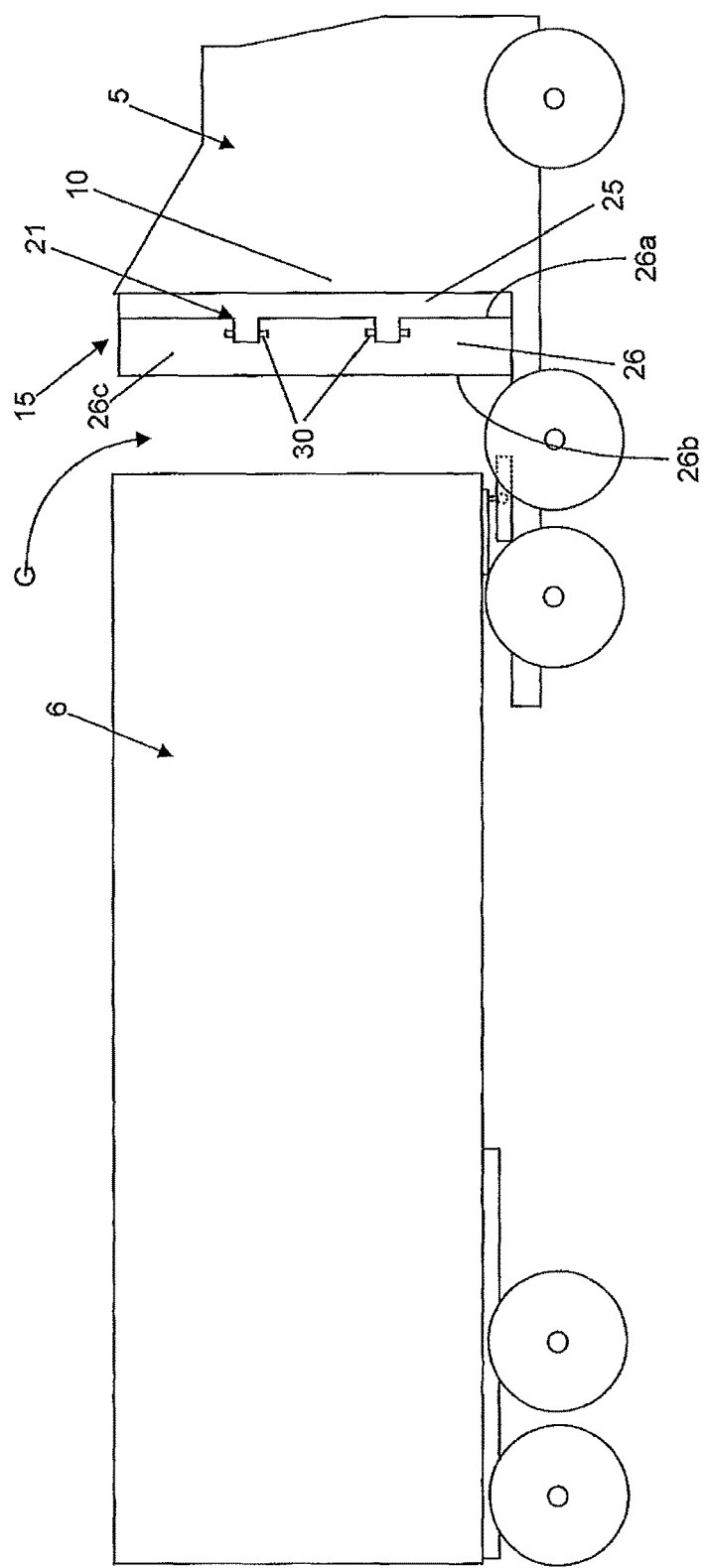
FIG. 1 depicts a side view of a lead vehicle provided with a self-adjusting side fairing assembly 15 according to one embodiment.
Figure 2:
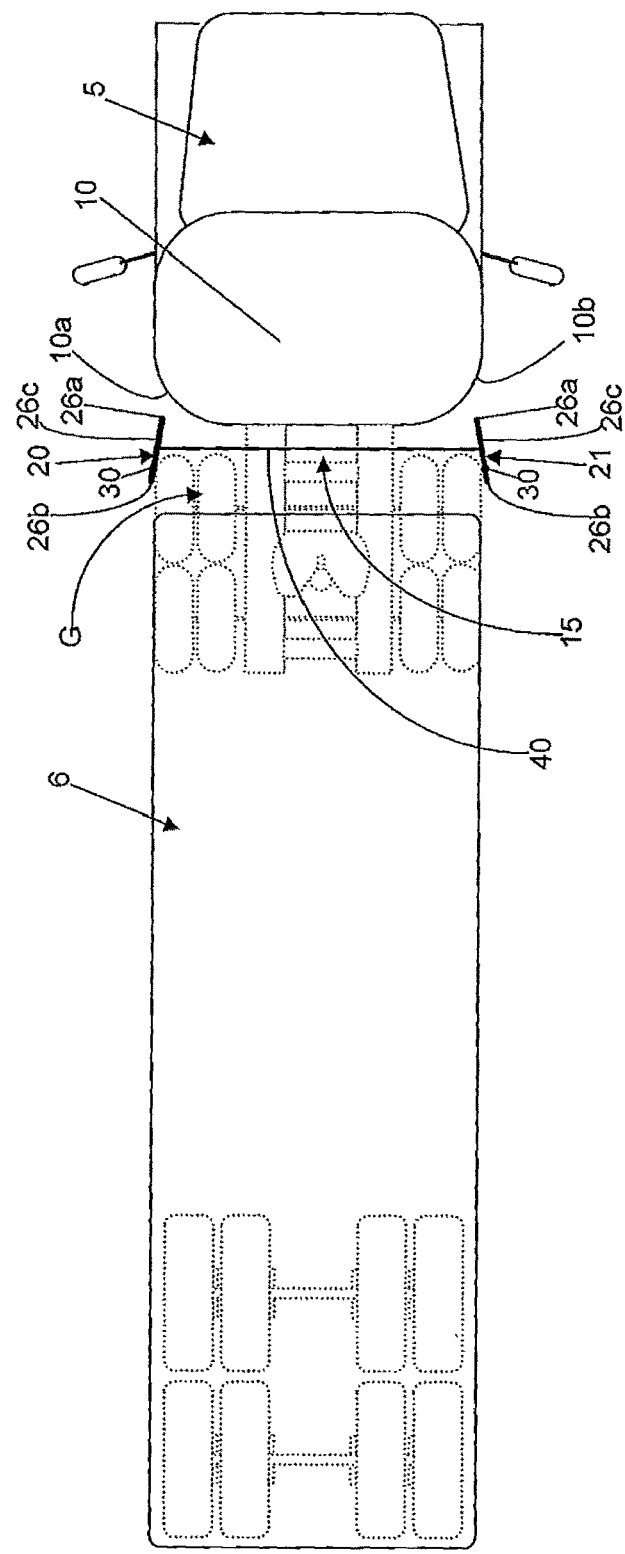
FIG. 2 depicts a top view of a trailing vehicle towed by a lead vehicle provided with a self-adjusting side fairing assembly according to one embodiment.
Figure 3:
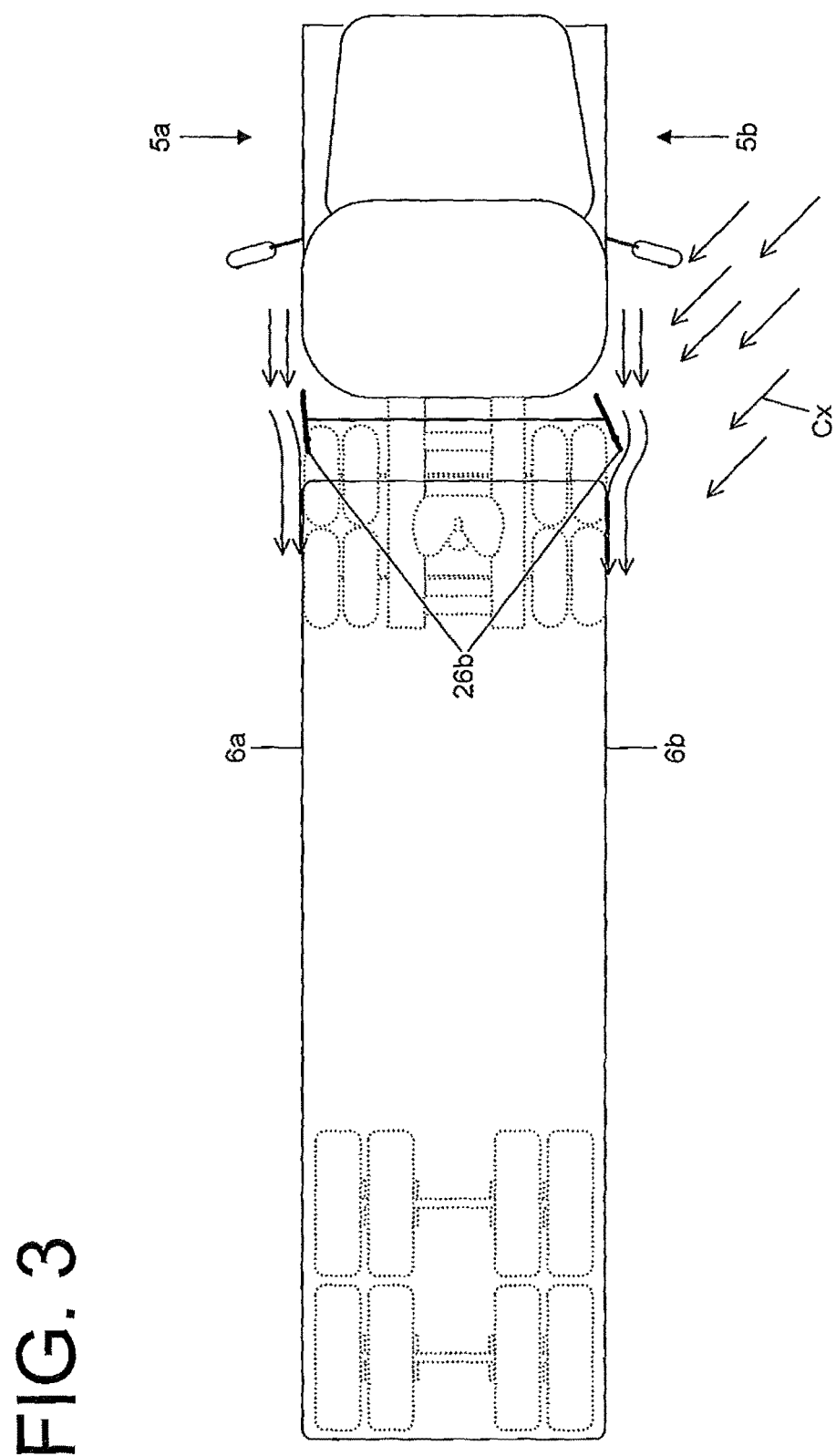
FIG. 3 depicts a top view of a trailing vehicle towed by a lead vehicle provided with a self-adjusting side fairing assembly 15 according to one embodiment.

FIGS. 1-6 illustrate a first embodiment of a self-adjusting side fairing assembly 15 according to one embodiment. As shown in FIGS. 1-3, the side fairing assembly 15 may be mounted on a lead vehicle 5 connected to a trailing vehicle 6. The lead vehicle 5 may be a tractor truck, as shown, and the trailing vehicle 6 may be a trailer, as shown. The vehicle 5 alternatively may be a leading trailer in a tandem or triple trailer combination. A trailer connected to the leading trailer would be the trailing vehicle 6. The leading vehicle 5 and connected trailing vehicle 6 are spaced longitudinally so that a gap G between the vehicles is provided. The gap G accommodates relative movement between the vehicles 5, 6, as for turning or road risings and fallings, to avoid contact between the vehicles 5, 6.

The side fairing assembly 15 is preferably located at the rear of the body 10, such as a tractor cab, on the lead vehicle 5. In the illustrated embodiment, the side fairing assembly 15 includes a first side fairing 20 and a second side fairing 21 located at opposing trailing edges 10a, 10b of the body 10. The side fairings 20, 21 may be mounted to the body 10 via brackets, as at 11.

According to one aspect of he present embodiment, as the lead vehicle 5 travels, the fairing assembly 15 is configured to have self-adjusting directional airflow characteristics responsive to crosswind characteristics Cx. According to yet another aspect of the present embodiment, as the lead vehicle 5 travels, trailing ends 26b of the fairings 20 or 21 on the windward side 5b is configured to pivot outward due to high pressure generated by cross wind characteristics on the windward side 5a and the fairing 20 or 21 on the leeward side is configured to pivot inward due to low pressure generated by cross wind characteristics Cx on the leeward side. Those of ordinary skill in the art will appreciate that the crosswind characteristics Cx may include crosswind speed and heading.

Turning now specifically to FIGS. 2. and 4, in the absence of a high external pressure that is greater than a high pressure threshold and a low external pressure that is less than a low pressure threshold, the side fairings 20, 21 assume non-pivotable positions, whereat both side fairings 20, 21 may be angled slightly outward to substantially the same degree, as shown. As shown, biasing members 60, such as, for example, springs, may bias the side fairings 20, 21 in the non-pivotable positions, until a sufficient high or low external pressure exists, which causes the side fairings 20, 21 to pivot.

Figure 4:
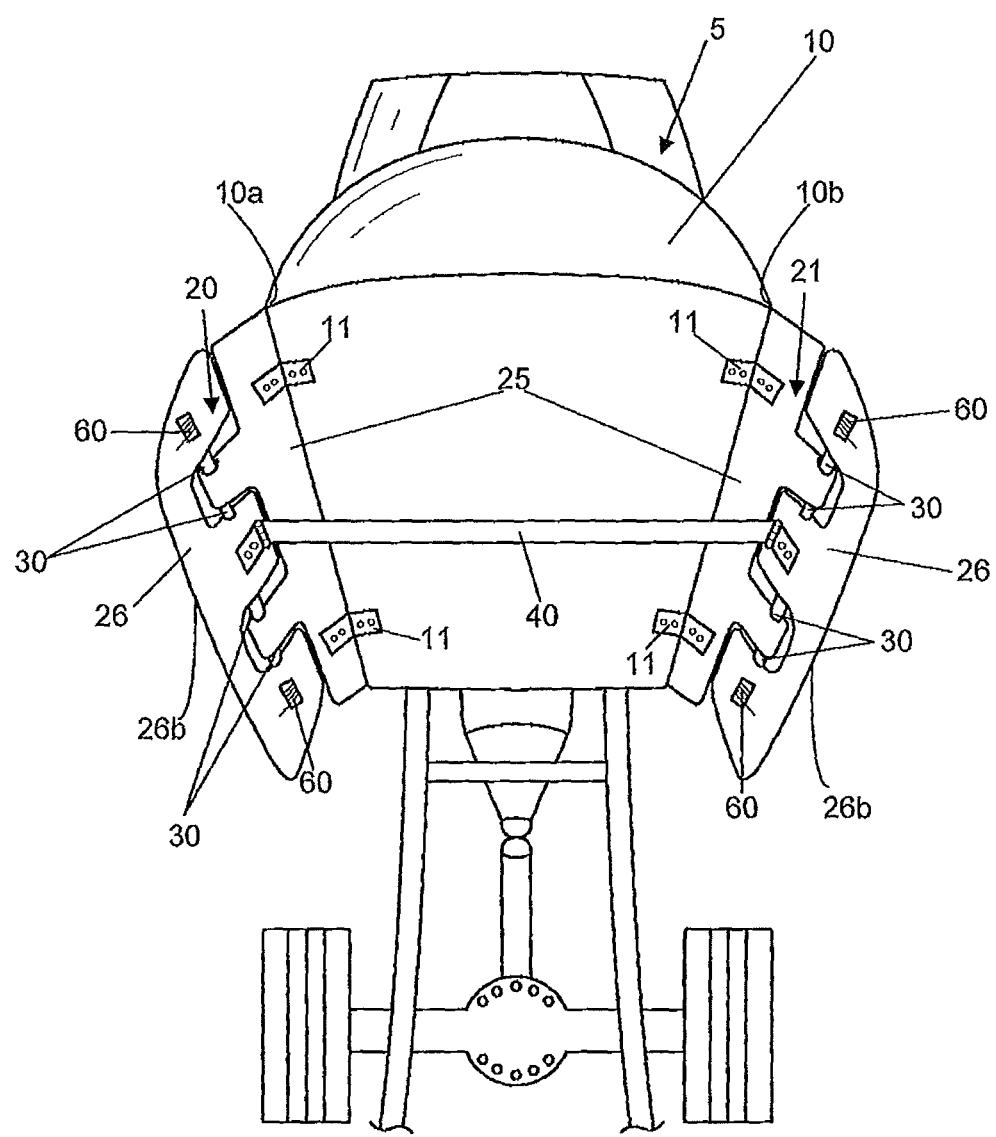
FIG. 4 depicts a rear perspective view of a lead vehicle provided with a self-adjusting side fairing assembly according to one embodiment.
Figure 5:
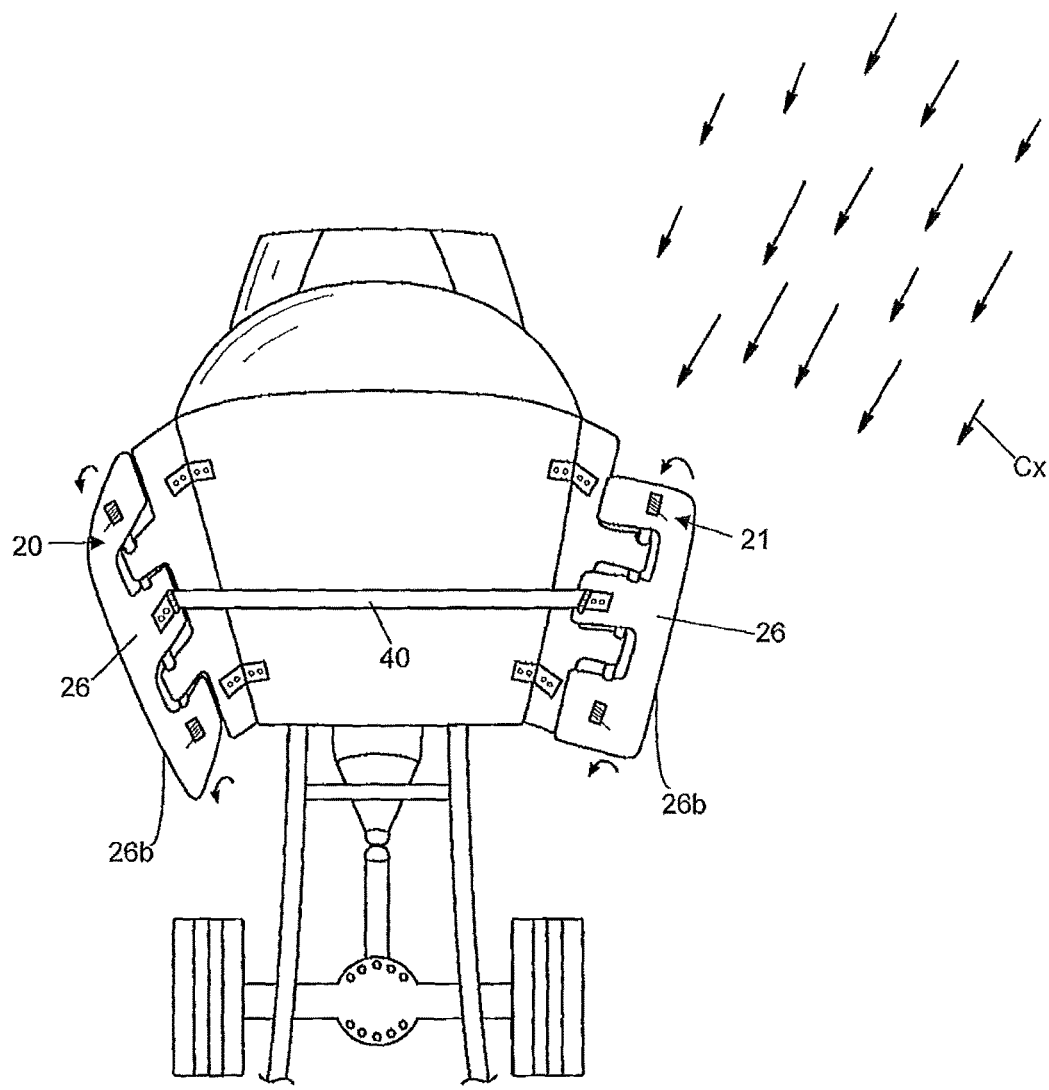
FIG. 5 depicts a rear perspective view of a lead vehicle provided with a self-adjusting side fairing assembly according to one embodiment.

Turning now specifically to FIGS. 3 and 5, as the lead vehicle 5 travels, the fairing, such as fairing 21, on the windward side 5b of the lead vehicle 5 is provided with an an outer surface, such as 26c, which may face a high external air pressure produced by cross wind characteristics Cx. As shown in FIGS. 3 and 5, when crosswind characteristics Cx generate a high external pressure in excess of a high pressure threshold, the trailing end 26b of side fairing 21 on the windward side 5b pivots outward due to the effect of the high external pressure generated by the crosswind characteristics Cx on the windward side 5b. Relative to the non-pivotable position, shown in FIGS. 2 and 4, when the windward side 5b side fairing 21 assumes an outward pilotable position, the side fairing 21 initially redirects fairing airflow further outward and away from the gap G between vehicles 5, 6 and then along the side 6b of the trailing vehicle 6. Advantageously, this further outward airflow will limit the ability of the crosswind to enter the gap G and increase drag on the front face of the trailing vehicle 6 and limit the ability of the crosswind to redirect fairing airflow into the gap G and increase drag on the front face of the trailing vehicle 6.

Advantageously, the more the high external pressure is greater than the high pressure threshold, the more the trailing end 26b pivots outward and the further initial outward travel the fairing airflow experiences. Those of ordinary skill in the art will appreciate that the side fairing 20 will behave in a similar manner when on the windward side 5b of the lead vehicle 5 and exposed to crosswind characteristics Cx.

Also shown in FIGS. 2 and 4, as the lead vehicle 5 travels, the fairing, such as fairing 20, on the leeward side 5a of the lead vehicle is provided with an outer surface, such as 26c, that may face a low external air pressure generated by crosswind characteristics Cx. As shown in FIGS. 3 and 5, when exposed to crosswind characteristics Cx that generate a low external pressure that is less than a low pressure threshold, the trailing end 26b side fairing 20 on the leeward side 5a pivots inward due to the effect of the low external pressure generated by the crosswind characteristics Cx on the leeward side 5a. Relative to a non-pivotable position of the side fairings 20, 21, shown in FIGS. 2 and 4, when the leeward 5a side fairing 20 is in an inward pivotable position, the side fairing 20 initially redirects fairing airflow further inward and more towards the gap G between vehicles 5, 6 and then along the side 6a of the trailing vehicle 6. Advantageously, this further inward airflow will account for the leeward side 5a crosswind Cx characteristics, which absent adjustment could cause fairing airflow to be directed excessively outward with respect to the side 6a of the trailing vehicle 6.

Advantageously, the more the low external pressure is less than the low pressure threshold, the more the trailing end 26b pivots inward and the further initial inward travel the fairing airflow experiences. Those of ordinary skill in the art will appreciate that the side fairing 21 will behave in a similar manner when on the leeward side 5a of the lead vehicle 5 and exposed to a crosswind characteristics Cx.

Also shown, the side fairing assembly 15 includes pivot points 30, which may, by way of example and not limitation, be in the form of journal bearings, as shown. The pivot points 30 allow the trailing ends 26b, 26b to pivot outward and inward in response to the presence or absence of a crosswind. In the present embodiment, the fairings 20, 21 include a fixed fairing portions 25 and pivotable fairing portions 26. As shown, the fixed fairing portions 25 are located closer to the body 10 than the pivotable fairing portions 26 and mounted to the brackets, as at 11. The pivot points 30 provide an attachment interface between the fixed fairing portions 25 and the pivotable fairing portions 26 and allow the pivotable fairing portions 26 to pivot relative to the fixed fairing portions 25 and the body 10 of the lead vehicle 5.

Figure 6:
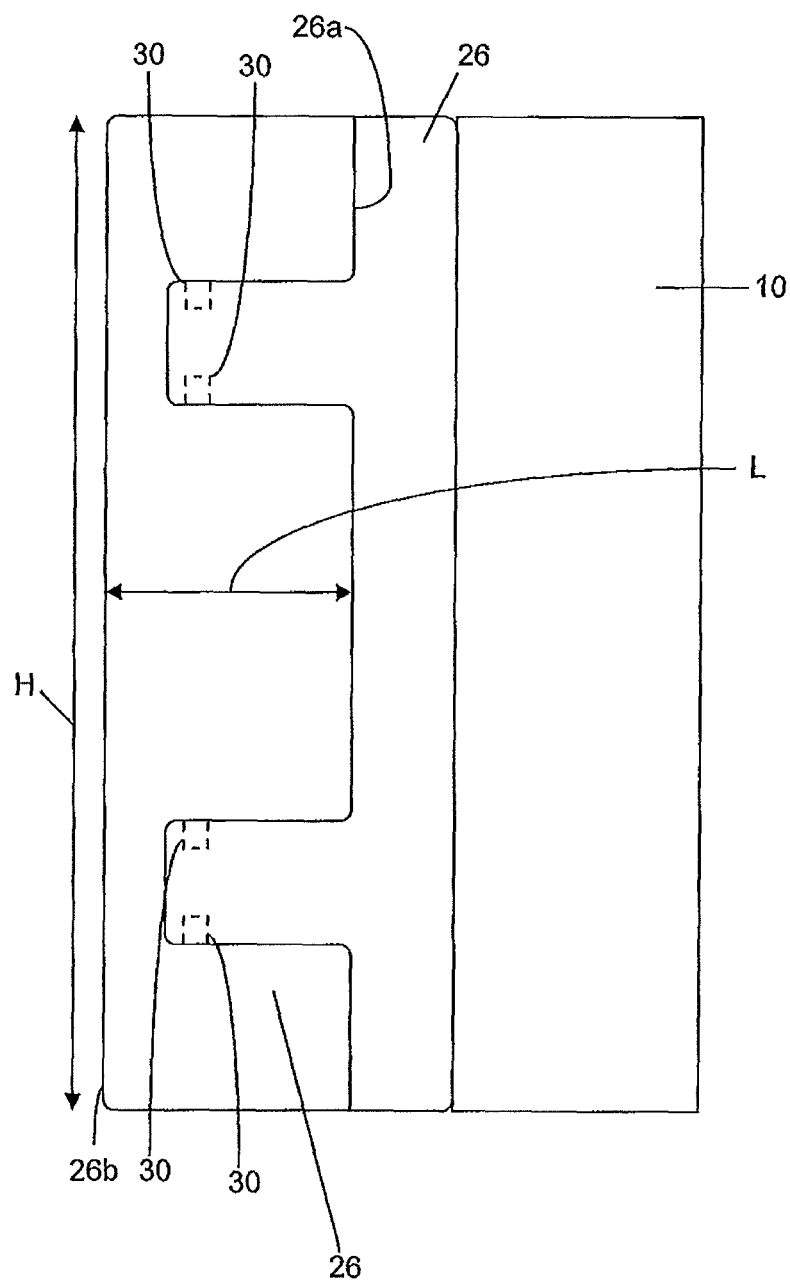
FIG. 6 depicts a side view of a self-adjusting side fairing assembly 15 according to one embodiment.

As shown, in FIG. 6, the pivotable fairing portion 26 includes a height H that extends from top to bottom and a length L that extends from a terminus of a leading end 26a to terminus of a trailing end 26b of the pivotable fairing portion 26. As shown, the pivot points 30 are located closer to the trailing end 26b than to a leading end 26a of the pivotable fairing portion 26, whereby high pressure results in an outward pivoting motion and a low pressure results in an inward pivoting motion. Preferably the pivot points are located at least about $\frac{2}{3}$ along the length L, whereby the pivot points are located closer to the trailing ends 26b of the pivotable fairing portions 26 than to the leading ends 26a of the pivotable fairing portions 26.

As shown in FIGS. 2-5, the pivotable fairing portions 26 of the fairings 20, 21 may be interconnected by a linkage 40 that extends from fairing 20 to fairing 21 and couples the pivotable motion of the fairings 20, 21 together, whereby an outward pivotable motion of one fairing 20, 21 generates a corresponding inward pivotable motion of the other fairing 20, 21 and vice versa.

Figure 7:
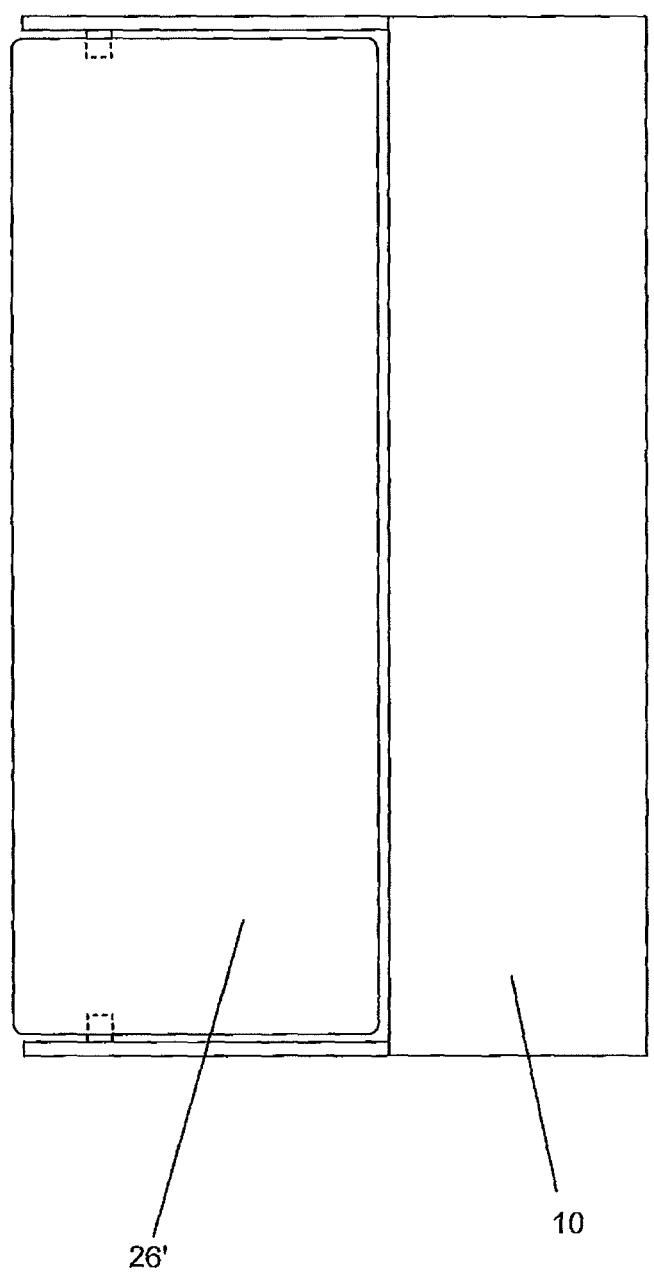
FIG. 7 depicts a side view of a self-adjusting side fairing assembly 15 according to one embodiment.
Figure 8:
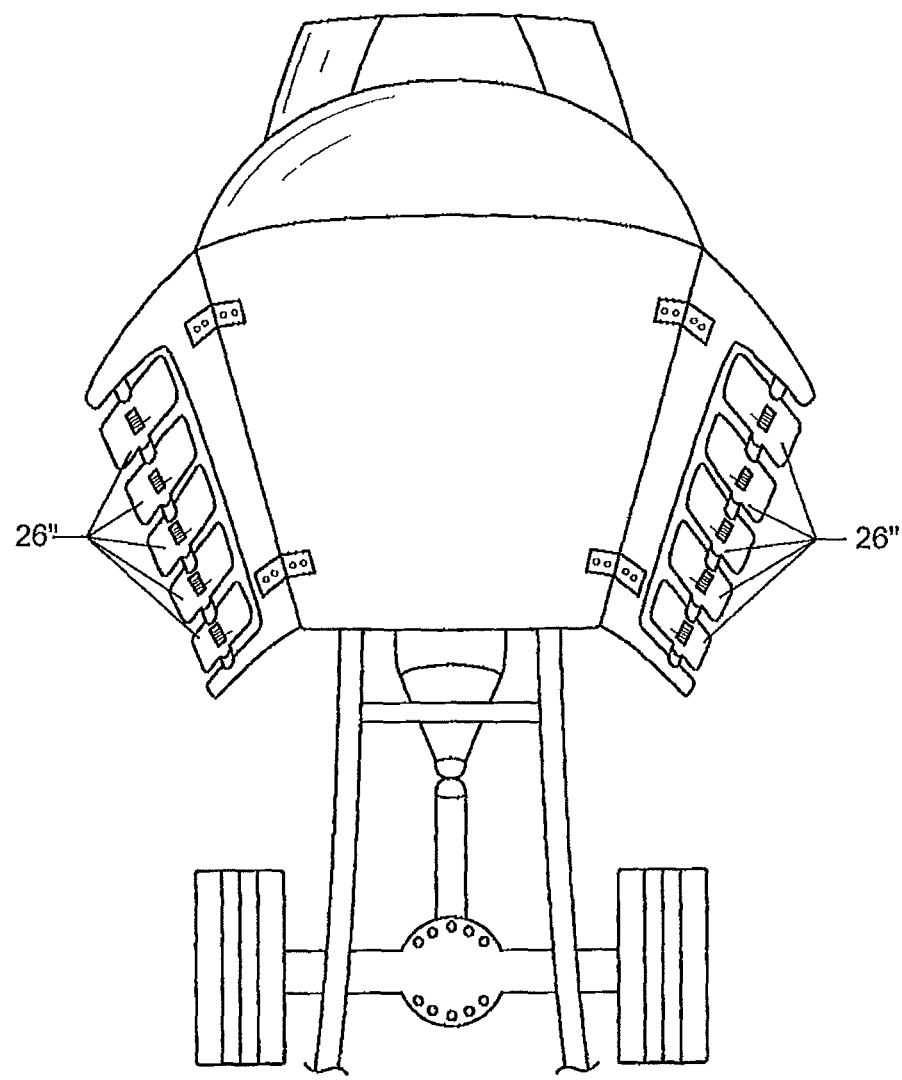
FIG. 8 depicts a rear perspective view of a lead vehicle provided with a self-adjusting side fairing assembly according to one embodiment.
Figure 9:
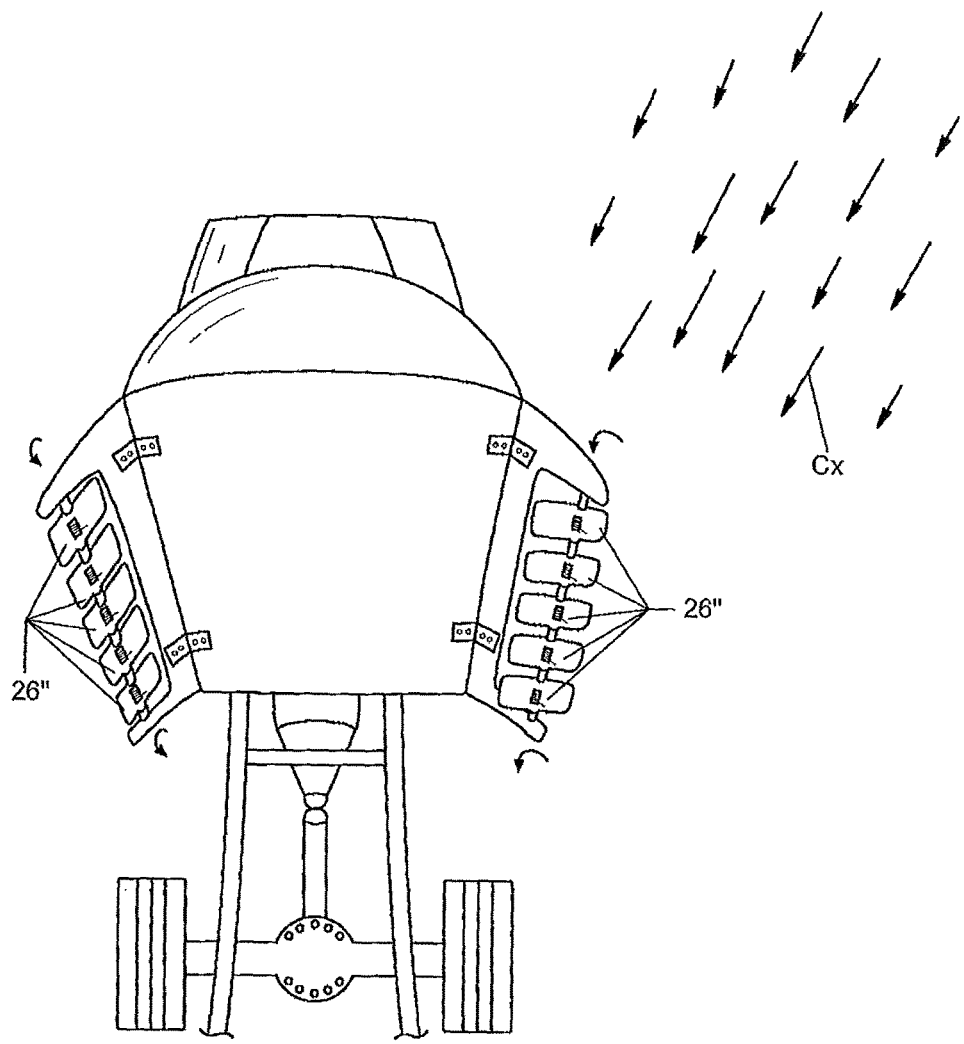
FIG. 9 depicts a rear perspective view of a lead vehicle provided with a self-adjusting side fairing assembly according to one embodiment.

The present description depicts specific examples to teach those skilled in the art how to make and use the best mode of the invention. The detailed descriptions of the above embodiments are not exhaustive descriptions of all embodiments contemplated by the inventors to be within the scope of the invention. By way of example, and not limitation, although the fairings 20, 21 of the present embodiment are illustrated as including two pieces, in alternative embodiments, the fairings may include any number of portions, including, but not limited to, a one piece pivotable fairing portion 26', as shown in FIG. 7, or multiple pivotable fairing portions 26" that extend along the height H of the fairings, as shown in FIGS. 8 and 9. By way of another example and not limitation, as exemplified by the embodiment shown in FIGS. 8 and 9, the pivotable potions 26, 26' 26" of the fairings 20, 21 may be pivotably uncoupled, in contrast to the embodiment shown in FIGS. 1-4 wherein the pivotable fairing portions 26 of the fairings 20, 21 are shown interconnected by linkage 40.

Persons skilled in the art will recognize that certain elements of the above-described embodiments may variously be combined or eliminated to create further embodiments, and such further embodiments fall within the scope and teachings of the invention. Thus, although specific embodiments of, and examples for, the invention are described herein for illustrative purposes, various equivalent modifications are possible within the scope of the invention, as those skilled in the relevant art will recognize. Accordingly, the scope of the invention is determined from the appended claims and equivalents thereof.

I claim:

1. A self-adjusting side fairing assembly, comprising:
   a first side fairing adapted to be located at a trailing edge of a body on a lead vehicle;
   a second side fairing adapted to be located at an opposing trailing edge of the body on the lead vehicle;
   the first and second side fairings adapted so that trailing ends of the first and second side fairings pivot outward due to the effect of a high external pressure that is greater than high pressure threshold and generated by windward side crosswind characteristics and inward due to the effect of a low external pressure that is less than a low pressure threshold and generated by leeward side crosswind characteristics, whereby the first and second side fairings have self-adjusting directional airflow characteristics in response to windward side and leeward side crosswind characteristics; and
   biasing members adapted to bias the first and second side fairings in non-pivotable positions until the high or low external pressures cause the trailing ends to pivot outward or inward, relative to the non-pivotable positions.

2. The self-adjusting side fairing assembly according to claim 1, wherein the first and second side fairings include fixed fairing portions and pivotable fairing portions, wherein the first and second side fairings are adapted so that the fixed fairing portions are located closer to the body on the lead vehicle than the pivotable fairing portions.

3. The self-adjusting side fairing assembly according to claim 1, wherein:
   the first and second side fairings include fixed fairing portions and pivotable fairing portions;
   the trailing ends of the first and second side fairings are located on the pivotable fairing portions; and
   pivotable points provide an attachment interface between the fixed fairing portions and the pivotable fairing portions and allow the trailing ends on the pivotable fairing portions to pivot inward or outward relative to the fixed fairing portions and the body of the lead vehicle in response to the high and low external pressures.

4. The self-adjusting side fairing assembly according to claim 1, wherein:
   the first and second side fairings include pivotable faking portions provided with leading ends and the trailing ends, the pivotable fairing portions being pivotable about pivot points; and
   the pivot points are located closer to the trailing ends of the pivotable fairing portions than to the leading ends of the pivotable fairing portions.

5. The self-adjusting side fairing assembly according to claim 1, wherein:
   the first and second side fairings include pivotable faking portions provided with leading ends and the trailing ends, the pivotable fairing portions being pivotable about pivot points; and
   the pivot points are located at least about ⅔ along the length L, between a terminus of the leading end and a terminus of the trailing end, whereby the pivot points are located closer to the trailing ends of the pivotable fairing portions than to the leading ends of the pivotable fairing portions.

6. The self-adjusting side fairing assembly according to claim 1, wherein the fairings are interconnected by a linkage that extends from the first fairing to the second fairing and couples the pivotable motion of the first and second fairings together.

7. A method for providing a self-adjusting side fairing assembly, comprising the steps of:
   providing a first side fairing adapted to be located at a trailing edge of a body on a lead vehicle and a second side fairing adapted to be located at an opposing trailing edge of the body on the lead vehicle, wherein:
   the first and second side fairings are adapted so that trailing ends of the first and second side fairings pivot outward due to the effect of a high external pressure that is greater than high pressure threshold and generated by windward side crosswind characteristics and inward due to the effect of a low external pressure that is less than a low pressure threshold and generated by leeward side crosswind characteristics, whereby the first and second side fairings have self-adjusting directional airflow characteristics in response to windward side and leeward side crosswind characteristics; and
   providing biasing members that are adapted to bias the first and second side fairings in non-pivotable positions until the high or low external pressures cause the trailing ends to pivot outward or inward, relative to the non-pivotable positions.

8. The method of providing the self-adjusting side fairing assembly according to claim 7, wherein the first and second side fairings include fixed fairing portions and pivotable fairing portions, wherein the first and second side fairings are adapted so that the fixed fairing portions are located closer to the body on the lead vehicle than the pivotable fairing portions.

9. The method of providing the self-adjusting side fairing assembly according to claim 7, wherein:
   the first and second side fairings include fixed fairing portions and pivotable fairing portions;
   the trailing ends of the first and second side fairings are located on the pivotable fairing portions; and
   pivotable points provide an attachment interface between the fixed fairing portions and the pivotable fairing portions and allow the trailing ends on the pivotable fairing portions to pivot inward or outward relative to the fixed fairing portions and the body of the lead vehicle in response to the high and low external pressures.

10. The method of providing the self-adjusting side fairing assembly according claim 7, the first and second side fairings include pivotable fairing portions provided with leading ends and the trailing ends, the pivotable fairing portions being pivotable about pivot points; and
    the pivot points are located closer to the trailing ends of the pivotable fairing portions than to the leading ends of the pivotable fairing portions.

11. The method of providing the self-adjusting side fairing assembly according to claim 7, wherein:
    the first and second side fairings include pivotable fairing portions provided with leading ends and the trailing ends, the pivotable fairing portions being pivotable about pivot points; and
    the pivot points are located at least about ⅔ along the length L between a terminus of the leading end and a terminus of the trailing end, whereby the pivot points are located closer to the trailing ends of the pivotable fairing portions than to the leading ends of the pivotable fairing portions.

12. The method of providing the self-adjusting side fairing assembly according to claim 7, further comprising the step of providing a linkage that interconnects the first and second fairings and couples the pivotable motion of the first and second fairings together.

\* \* \* \* \*